Figure 1:
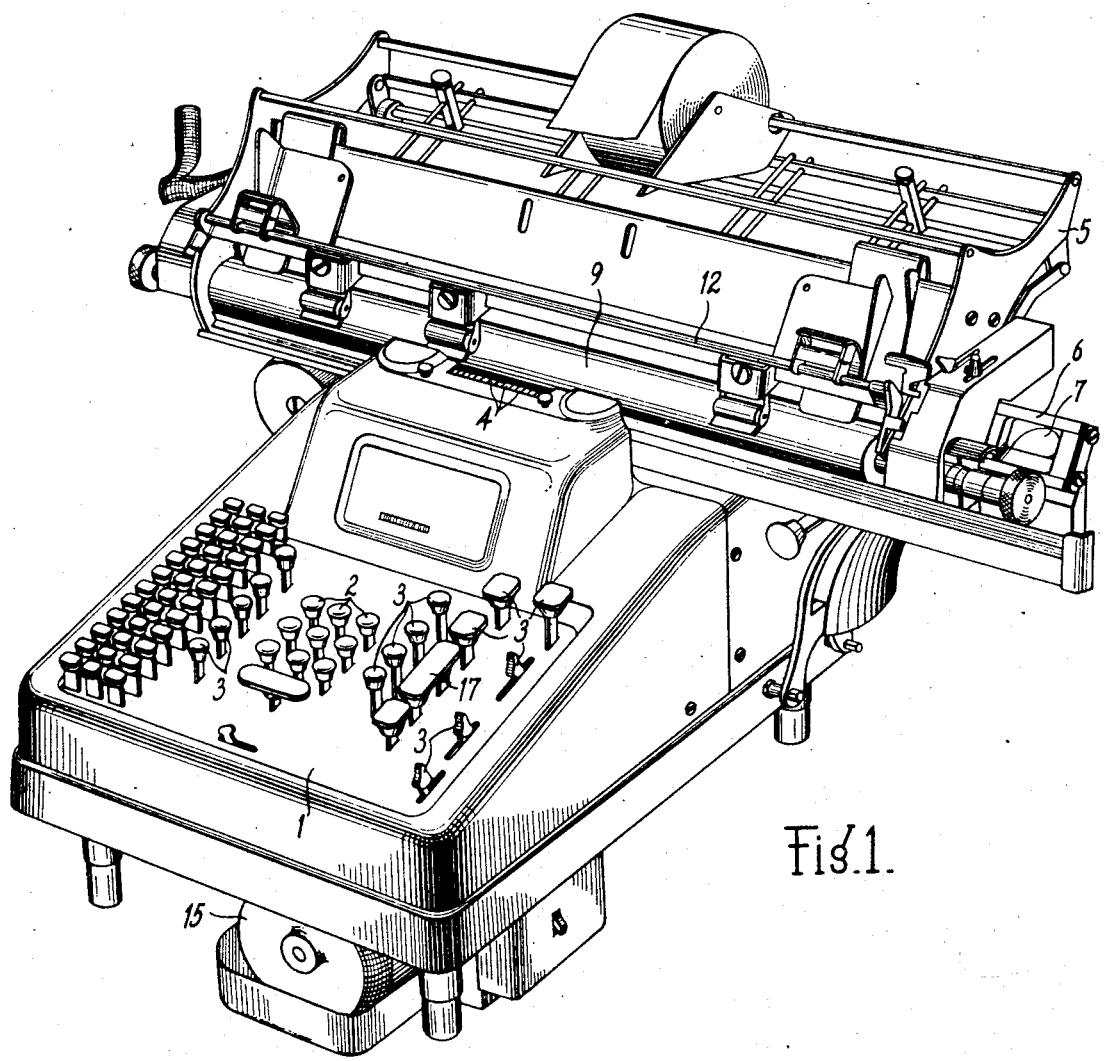

Jan. 28, 1941. W. A. ANDERSON 2,229,834
NEGATIVE TOTAL LOCK FOR ACCOUNTING MACHINES
Filed Dec. 29, 1939 5 Sheets-Sheet 1

INVENTOR
WALTER A. ANDERSON
BY
ATTORNEY

Jan. 28, 1941. W. A. ANDERSON 2,229,834
NEGATIVE TOTAL LOCK FOR ACCOUNTING MACHINES
Filed Dec. 29, 1939 5 Sheets-Sheet 2
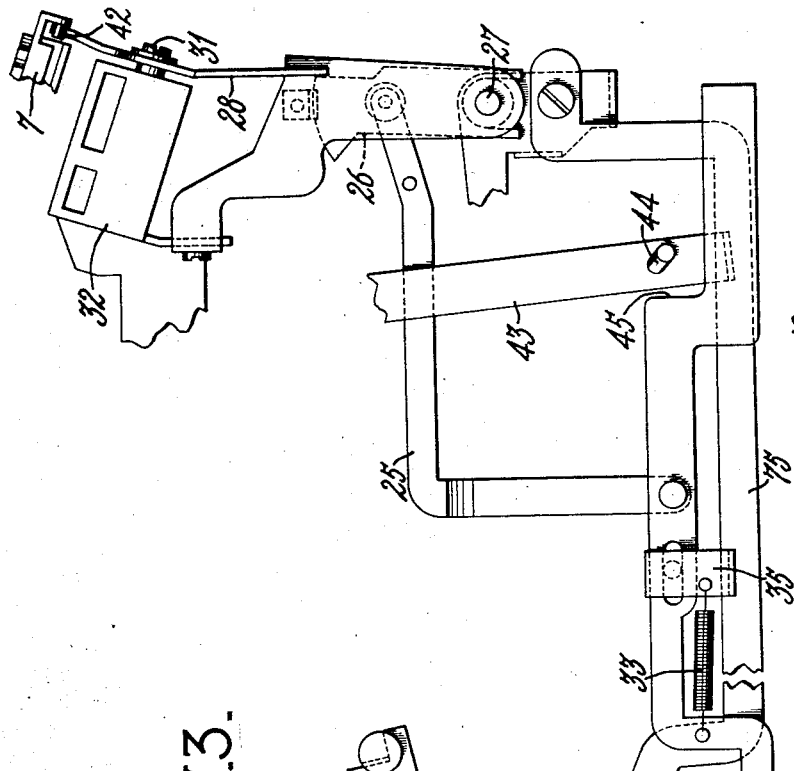
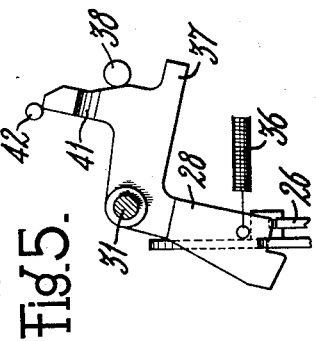
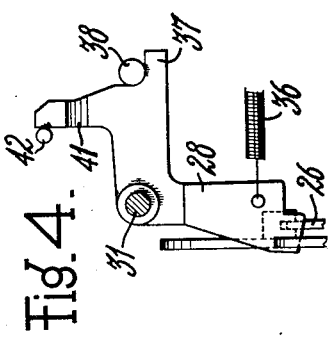
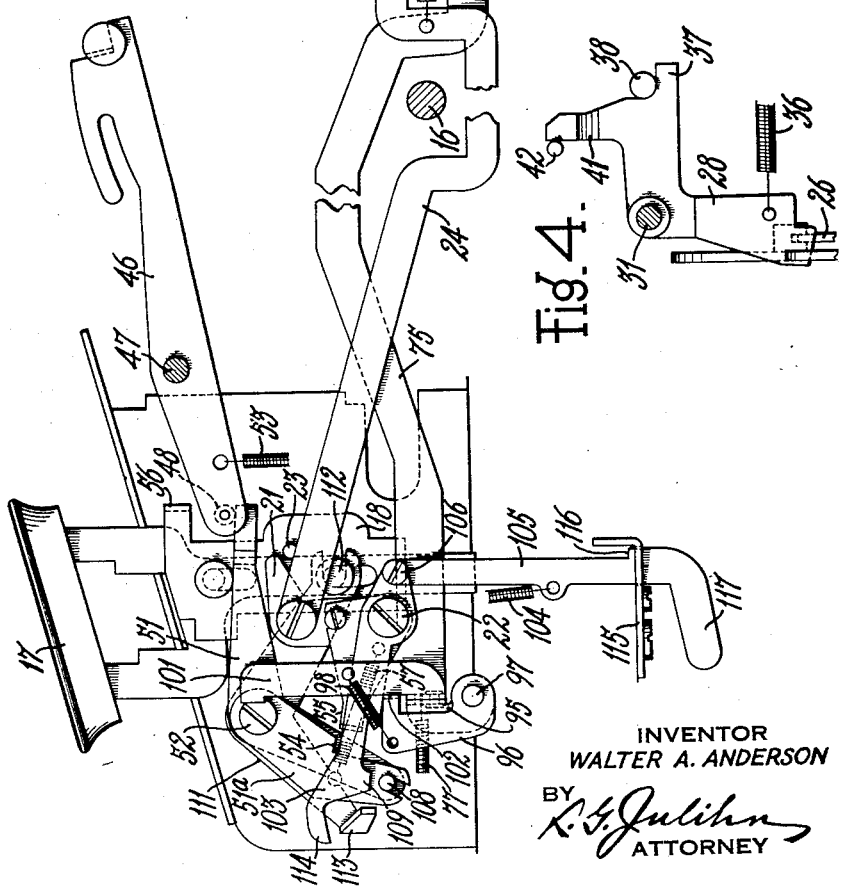
INVENTOR
WALTER A. ANDERSON
BY
ATTORNEY

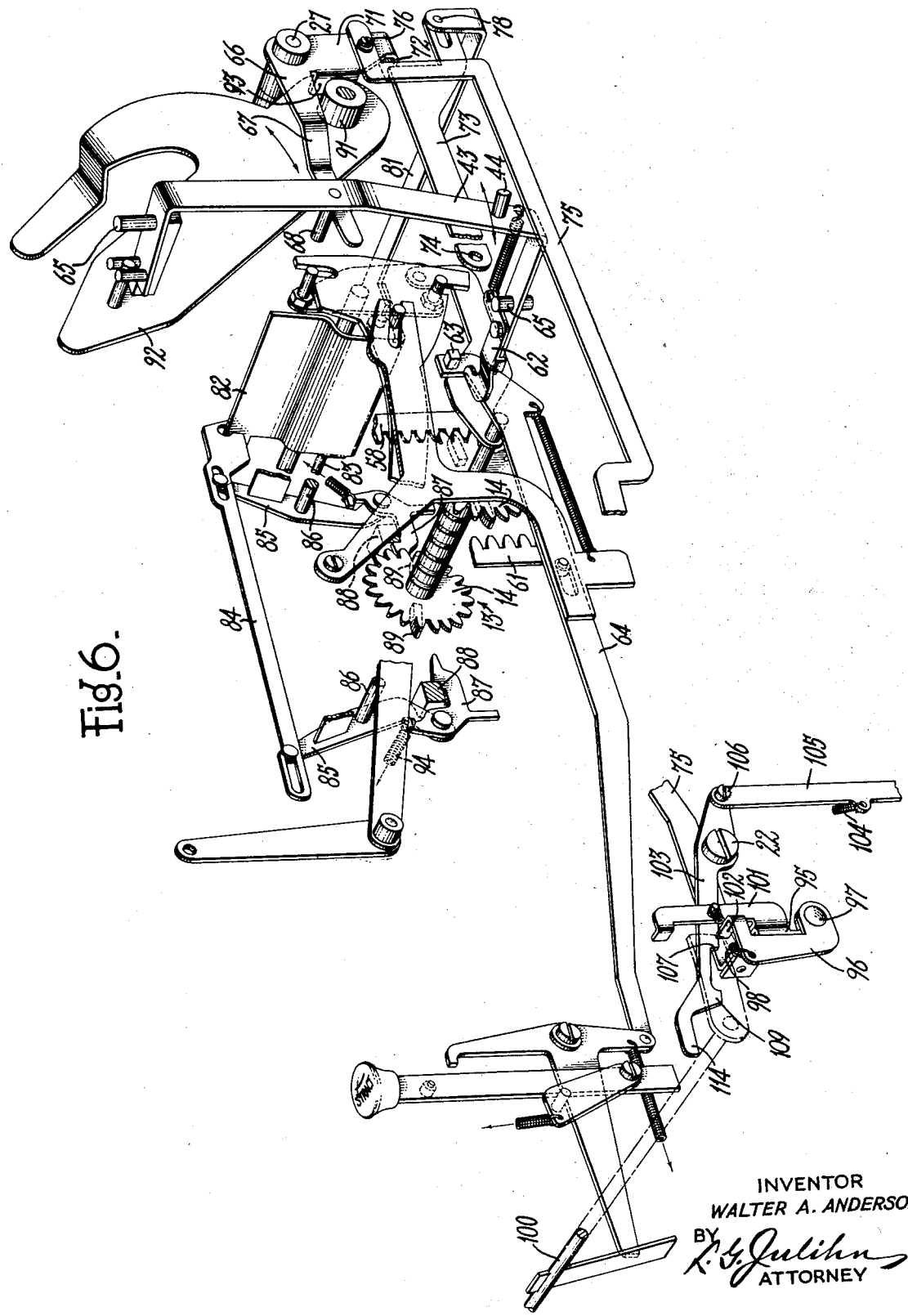

Jan. 28, 1941.  W. A. ANDERSON  2,229,834
NEGATIVE TOTAL LOCK FOR ACCOUNTING MACHINES
Filed Dec. 29, 1939  5 Sheets—Sheet 4

INVENTOR
WALTER A. ANDERSON
BY
*C. G. Julihn*
ATTORNEY

Patented Jan. 28, 1941

2,229,834

UNITED STATES PATENT OFFICE 2,229,834

NEGATIVE TOTAL LOCK FOR ACCOUNTING MACHINES

Walter A. Anderson, Bridgeport, Conn., assignor to Underwood Elliott Fisher Company, New York, N. Y., a corporation of Delaware Application December 29, 1939, Serial No. 311,574

6 Claims. (Cl. 235—60)

This invention relates to accounting machines, and more particularly to a means for preventing the automatic printing of negative totals.

It is well known that in bookkeeping operations performed on modern accounting machines, it is customary to automatically cycle the machine under the control of the traveling carriage to print totals or sub-totals of the computed debit and credit postings of the account. This automatic printing of totals occurs even though the totalizer is overdrafted and the total to be printed is negative. In certain bookkeeping operations, it is desirable to prevent the automatic printing of negative totals and thus notify the operator of the overdraft, whereas in other operations, this is not desirable.

It is an object of the present invention, therefore, to provide a simple, optionally operable means which, when set to effective position, prevents the automatic printing of a negative total and yet will permit manual printing of the negative total when desired by depressing the customary motor bar in the usual manner.

With this and incidental objects in view, the invention consists in certain novel features of construction and combinations of parts, the essential elements of which are set forth in appended claims, and a preferred embodiment of which is hereinafter described with reference to the drawings which accompany and form part of the specification.

Figure 2:
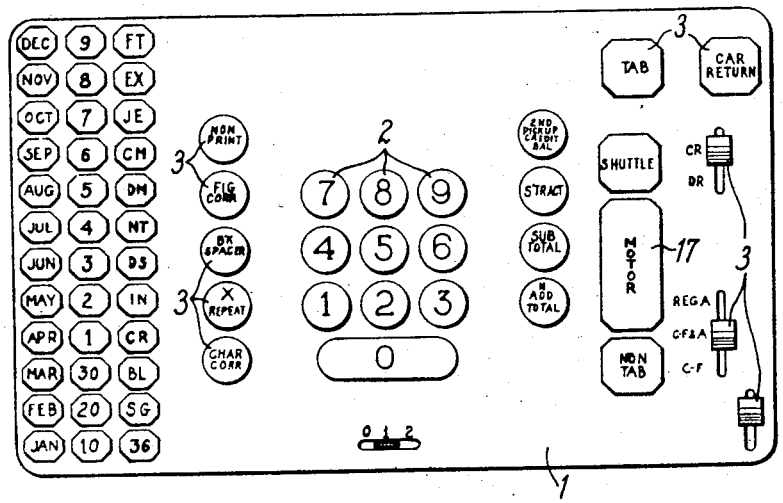
Figure 7:
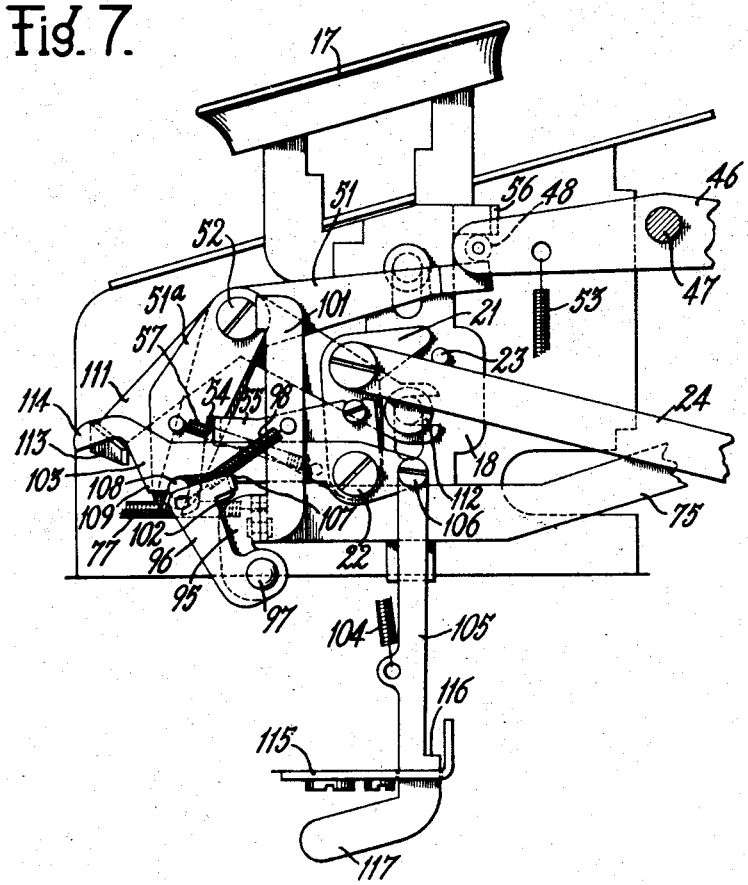
Figure 8:
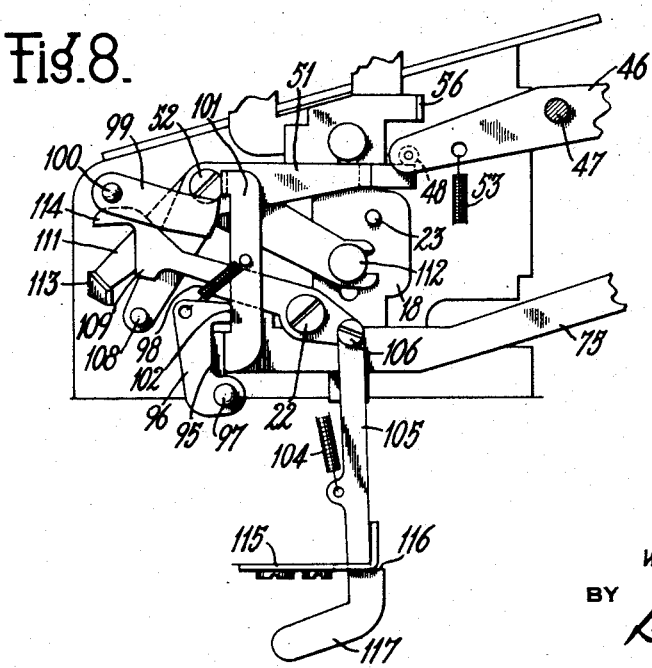
Figure 9:
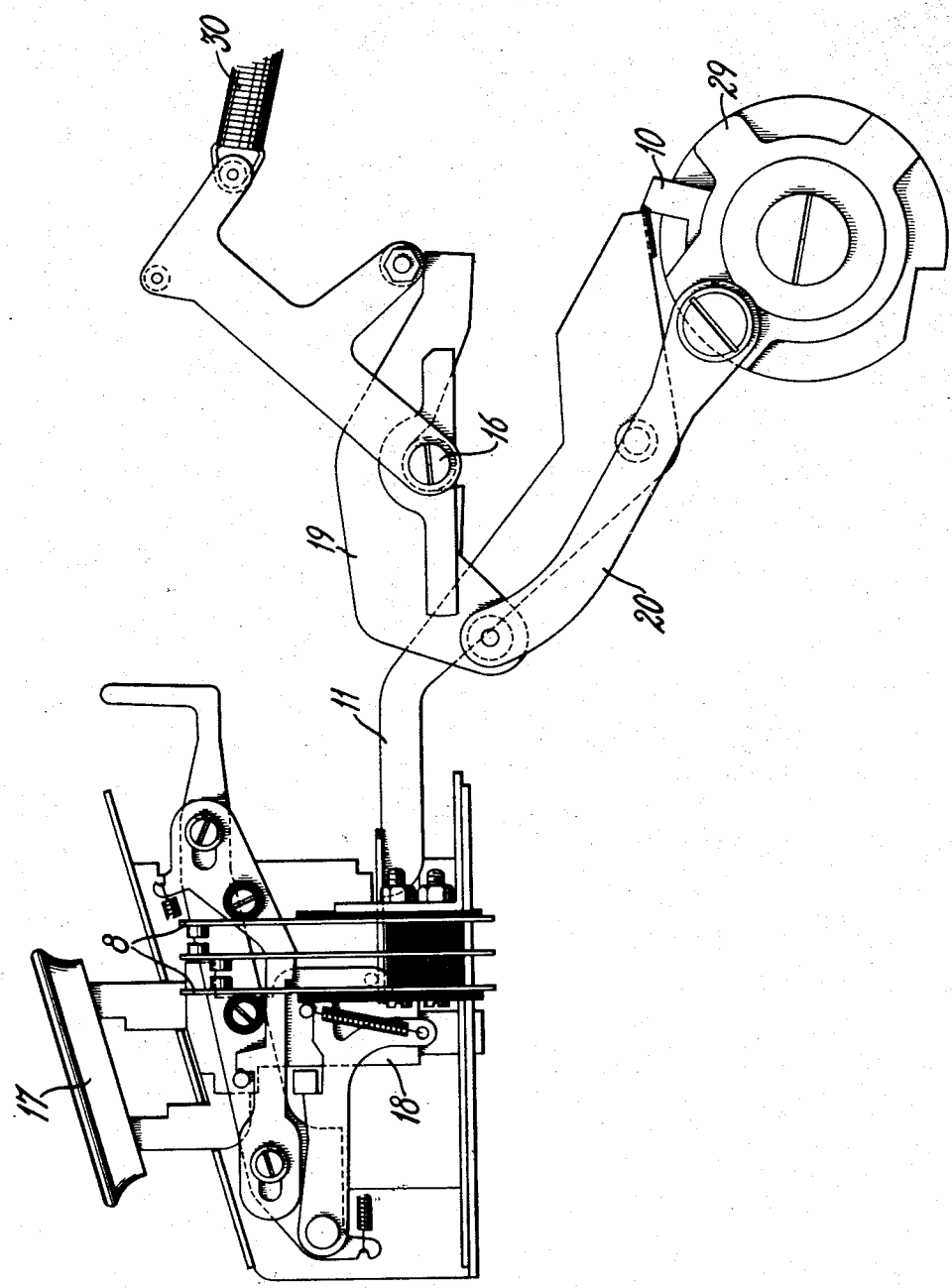

In the drawings:

Figure 1 is a perspective view of an accounting machine embodying the invention, Figure 2 is a diagrammatic view of the keyboard thereof, Figure 3 is a right side elevation showing the motor repeat mechanism, together with the mechanism for preventing an automatic cycle when the character of the total is negative, Figure 4 is a detail rear elevation of the motor repeat trip in normal position, Figure 5 is a view similar to Figure 4 but showing the parts in operated position, Figure 6 is a fragmental perspective view of the overdraft control mechanism that automatically conditions the totalizer to take a negative total, Figure 7 is a detailed right side elevation of the automatic cycle preventive means in operated position, Figure 8 is a view similar to Figure 7 but showing the automatic cycle preventive means disabled, and Figure 9 is a right side elevation of the mechanism for closing the motor circuit and for engaging the clutch between the motor and the actuating shaft.

The invention is herein exemplified in connection with mechanism of the general character disclosed in the United States Patents Nos. 1,583,-102, 1,934,747, 2,020,664, and 2,088,982, issued to Oscar J. Sundstrand, to which reference may be had for an understanding of the features not fully illustrated or described herein. It should, however, be understood that the present invention is not limited to machines of this character.

The machine is of the well-known ten-key, key set, motor operated type, having a traveling paper carriage with a number of controls incorporated thereon for automatically causing the machine to perform many of its functions in the proper columnar positions. The machine may be cycled manually by depressing the motor bar, or automatically under control of the traveling carriage.

INDEX OF TOPICS

1. The machine sections and actuating mechanism generally.
2. Carriage controlled motor repeat mechanism.
3. Overdraft control mechanism.
4. Lock to prevent motor repeat in sub-total and total columns when the totalizer contains a negative total.
5. Release of negative total lock.
6. Rendering negative total lock ineffective.

1. *The machine sections and actuating mechanism generally*

Referring to Figure 1, the machine includes the customary keyboard 1 having amount keys 2 and operation controlling keys 3, type bars 4 for printing on the work sheets, a laterally movable paper carriage indicated generally at 5, mounted on a track 6, and a control plate 7 mounted on the paper carriage and having a plurality of control pins for automatically controlling the operations of the machine in predetermined columnar positions. The carriage is provided with the customary roller platen 9, and the bail structure 12 for facilitating the insertion of front fed forms. The machine also includes an adding and subtracting totalizer, indicated generally at 13 (Figure 6), having a plurality of 20-tooth wheels 14.

The machine is actuated by an electric motor 15 (Figure 1). The motor is started by the closing of a suitable switch such as 8 (Figure 9), and is coupled with an actuating shaft 16 (Figure 3) by a suitable clutch mechanism such as 10 (Figure 9) upon depression of a motor bar 17. Depression of the motor bar depresses a slide 18 that in turn operates a lever 11 to release the clutch. The actuating shaft is coupled with the motor drive by a lever 19 and a link 20, the link being connected to a disk 29 that is rotated one revolution whenever the clutch 10 is released. The first half revolution of disk 29 oscillates actuating shaft 16 about ninety degrees counterclockwise. Shaft 16 is returned to its home position by a spring 30.

2. Carriage controlled motor repeat mechanism

Mechanism similar to that disclosed in the above-mentioned Patent No. 2,020,664 is provided to automatically cycle the machine under the control of the paper carriage in predetermined columnar positions. This mechanism includes a lever 21 pivoted on a screw 22 secured in the machine frame. The upper end of the lever overlies a pin 23 fixed in slide 18. A link 24, pivoted at its forward end to lever 21 and suitably guided for horizontal movement, is pivotally connected, by an extension 25, to an arm 26 pivoted on a stud 27 on the machine frame. The upper end of arm 26 lies immediately in front of a trip lever 28 pivoted at 31 on a carriage control housing 32. A spring 33, connected at one end to link 24 and at its opposite end to a stationary bracket 35, tensions the link toward the right and arm 26 against the lower end of trip lever 28. As shown in Figure 4, lever 28 is normally tensioned counter-clockwise about pivot 31 by a spring 36, and when in its normal position, its lower end lies in obstructing position with respect to arm 26, a lug 37 thereon abutting a stud 38 fixed on housing 32 to so locate the lever. An upward extension 41 on the lever lies in the path of pins such as 42 that are placed on the carriage control plate 7 in those columnar positions wherein it is desired to have the machine automatically cycled.

As the carriage advances to one of these positions, a pin 42 strikes extension 41 and rocks lever 28 clockwise about pivot 31, as shown in Figure 5. This action releases arm 26 to the tension of spring 33, which pulls link 24 toward the right and swings lever 21 clockwise about its pivot 22, causing its upper end to engage stud 23 and depress slide 18, initiating a machine cycle.

Means is provided for restoring the arm 26 to its latched position in order that the machine shall stop at the end of the cycle of operations. This means is similar to that disclosed in the aforementioned Patent No. 2,020,664, and includes a bail 43 (better shown in Figure 6) which corresponds to the member 1057 in Patent No. 3,088,982. Bail 43 carries a pin 44 that is arranged to engage a shoulder 45 on link 24 and push the link forward so as to withdraw lever 21 from pin 23 and swing lever 26 into a position in front of trip lever 28. On the return stroke of the main rock shaft 16, as pin 44 moves away from the shoulder 45, spring 33 again tensions arm 26 against trip lever 28, in readiness to initiate the next cycle.

Suitable carriage tabulating mechanism similar to that disclosed in Patent No. 2,088,982 is provided to automatically tabulate the carriage from one column to the next. This mechanism operates during the return stroke of rock shaft 16. There is, therefore, a possibility that incident to such tabulation, a control pin 42 might trip lever 28 to initiate a new cycle before the instant cycle is completed. Mechanism similar to that disclosed in Patent No. 2,020,664 is provided to prevent such misoperation. Briefly, this mechanism comprises a lever 46 (corresponding to lever 36 in Patent No. 2,020,664) pivoted at 47 and carrying a stud 48. An arm (not shown), connected with rock shaft 16, is arranged to rock lever 46 clockwise against the tension of a spring 53 toward the end of the forward stroke of the rock shaft, and a detent (not shown), cooperating with this mechanism, holds lever 46 in such rocked position until the end of the return stroke when the arm releases the detent and allows spring 53 to restore lever 46 to its normal position shown in Figure 3. As lever 46 swings clockwise, stud 48 is raised to a position immediately beneath a lug 56 on slide 18, as shown in Figure 7, to lock slide 18 against depression and thus prevent premature initiation of a machine cycle.

In order to have lever 21 function properly, i. e., to have it depress slide 18 for initiating a cycle, it is necessary that the lever be released from the position shown in Figure 3, where it lies a slight distance from pin 23, rather than from a position where it would be touching pin 23. This is required to give the lever the necessary impetus to overcome the resistance offered by slide 18 and its associated clutch releasing parts.

Also it is necessary that there be a sufficient lapse of time between the release of the carriage for tabulation, and the movement of arm 26 to the rear to rest against lever 28, for the carriage to move stud 42 past the extension 41 on trip lever 28, to allow spring 36 to restore trip lever 28 to its latching position. To accomplish this, there is provided a bell crank 51 pivoted at 52 and having a horizontal arm lying beneath stud 48. The opposite arm of bell crank 51 carries a plate 51a that has a shoulder 54 arranged to overlie an extension 55 of lever 21. A spring 57, connected between the bell crank and extension 55, tensions bell crank counter-clockwise about pivot 52, holding the horizontal arm of the bell crank against stud 48. Since spring 53 is superior in strength to spring 57, bell crank 51 is normally held in the position shown in Figure 3, where shoulder 54 is out of engagement with extension 55. However, when lever 46 is rocked clockwise as above described, shoulder 54 is permitted to engage extension 55 as soon as lever 21 is rocked counter-clockwise by pin 44. Shoulder 54 then holds lever 21 in its forward position until it is withdrawn from engagement with extension 55 by the counter-clockwise movement of lever 46 at the end of the return stroke, as described in the foregoing. By this means, arm 26 is held forward long enough to allow lever 28 to return to its latching position.

3. Overdraft control mechanism

Totalizer 13 is normally in mesh with adding racks such as 58 (Figure 6) in both accumulating and total taking operations. Depression of the subtract key conditions mechanism for engaging the totalizer with subtracting racks such as 61 in accumulating operations. A mechanism similar to that disclosed in Patent No. 2,088,982 is provided on this machine to insure automatic engagement of the totalizer with the subtracting racks during the blank cycle preceding the taking of the total, in the event that the totalizer has become overdrafted, i. e., credit amounts have exceeded debit amounts, creating a negative total. This mechanism includes the following parts.

The lower arm of bail 43 carries a yielding projection 62 arranged to be elevated to lie directly in front of a stud 63 fixed on a slide 64 that controls the engagement of wheels 14 with subtraction racks 61 (as explained in the above-mentioned patent). The means for elevating bail 43 comprises a bell crank 66 pivoted on stud 27 and having a horizontal arm 67 underlying a pin 68 secured to the bail. The vertical arm 71 of the bell crank has an inturned flange 72 that normally, during each cycle of the machine, stops against a stop lever 73 pivoted as at 74 in the machine frame. A link 75 (No. 1076 in Patent No. 2,088,982), pivoted on a stud 76 secured in arm 71, has connected thereto a spring 77 which tensions flange 72 toward stop lever 73.

The rear end of lever 73 embraces a pin 78 fixed in an extension 81 of a plate 82 mounted for pivotal movement on a rod 83 supported in the machine frame. The upper edge of plate 82 lies within a slot in the rear end of a link 84 connected by a pin-and-slot connection with arms 85 pivoted on rods 86. Arms 85 are provided with dogs 87 that latch on bars 88 fixed in the machine frame on opposite sides of wheels 14. The dogs are arranged to be disengaged from bars 88 by diametrically opposed lugs 89 on the totalizer wheel 14 of highest order.

A roller 91 on the lower end of a lever 92 that oscillates forward and back during each cycle of the machine is arranged to bear against a flange 93 on arm 71 of bell crank 66, and hold flange 72 a short distance away from stop lever 73 when lever 92 is in its normal position shown in Figure 6. When an amount accumulated in the totalizer represents a debit balance, the parts are in the position shown in Figure 6. However, when the totalizer is overdrafted, the wheel 14 of highest order passes through zero, causing lug 89 to trip dog 87 on the subtract side of the totalizer and to swing arm 85 clockwise about its rod 86 under tension of a spring 94. This movement thrusts link 84 toward the right, as viewed in Figure 6, rocks plate 82 clockwise about rod 83, and swings stop lever 73 downwardly, about its pivot 74, out of the path of flange 72.

If a blank cycle is now taken to condition the machine for a total operation, the movement of roller 91 away from flange 93, at the beginning of the cycle, allows bell crank 66 to swing clockwise about stud 27 to move link 75 forward. During this movement, arm 67 elevates bail 43, bringing projection 62 into the plane of stud 63. Clockwise oscillation of bail 43 about its two pivot studs 65 then causes the projection to strike the stud and thrust slide 64 rearwardly to actuate parts which will place wheels 14 in engagement with subtraction racks 61 at the beginning of the last half of the cycle, preparatory to the taking of the negative total on the succeeding cycle. At the end of the second half of the blank cycle, roller 91 again strikes flange 93, rocking bell crank 66 counterclockwise to its normal position.

Mechanism similar to that disclosed in Patent No. 2,088,982 is provided on the forward end of link 75 to prevent the link from moving forward when an amount is indexed in the keyboard, so that even though stop lever 73 is lowered out of the path of flange 72 by virtue of the presence of a negative balance in the totalizer, the latter will not be automatically engaged with the subtraction racks for accumulating operations. This mechanism includes an arm 99 (Figure 8) secured on a shaft 100, the arm being moved by the shaft into the path of forward movement of an arm 101 on the forward end of link 75, when an amount is indexed on the keyboard. Hence, it is apparent that link 75 will be permitted to come forward under the tension of spring 77 only during a blank cycle, and further, only when there is an overdraft in the totalizer. This should be borne in mind since this link controls the locking of the automatic motor repeat mechanism to prevent the printing of a negative total, as will now be described.

4. *Lock to prevent motor repeat in sub-total and total columns when the totalizer contains a negative total*

A bracket 95 (Figure 3) fixed on the forward end of link 75 carries an arm 96 pivoted at 97 to the bracket. A spring 98, connected between arm 96 and arm 101 on link 75, holds a flange 102, formed on arm 96, against arm 101. A lock lever 103 is pivoted on screw 22 and is connected at 106 to a latch 105. A spring 104, connected between the latch and the machine frame, tensions the latch upwardly and lever 103 counter-clockwise, holding the lower edge of lever 103 against flange 102.

Considering the totalizer as containing a negative total, and that the machine is going through the necessary blank cycle preceding the taking of the total, as link 75 moves forward as above described, flange 102 moves forward of a shoulder 107 on lever 103 (see also Figure 6), permitting the tension of spring 104 to lower the forward end of lever 103 until a projection 109 thereon rests on a pin 108 secured to the lower end of bell crank 51. Toward the end of the first half of the cycle, when clockwise movement of lever 46 allows bell crank 51 to rock counter-clockwise about pivot 52 to place shoulder 54 over extension 55, pin 108 moves to the rear of projection 109, allowing lever 103 to swing further counter-clockwise, where projection 109 lies in front of the pin, as shown in Figure 7. During the latter half of the cycle, link 75 moves to the rear to the position shown in Figure 3, spring 98 yielding to permit such movement. The parts are now in the position shown in Figure 7. Upon the carriage tabulating to the adjacent sub-total or total columnar position, even though a pin 42 trips lever 28 to initiate a cycle for printing the total, the cycle is prevented because lever 21 is prevented from being moved clockwise to depress the motor bar. This notifies the operator that the totalizer contains a negative total.

5. *Release of negative total lock*

When the operator desires to print the negative total, he need only depress motor bar 17 to release the machine. The depression also releases lock lever 103 by the following connection. A bell crank 111 (Figure 7), pivoted at 52 adjacent bell crank 51, is bifurcated at one end to embrace a stud 112 on the stem of the motor bar, and has a flange 113 at its other end underlying a projection 114 on the left end of lock lever 103. Upon depression of the motor bar, bell crank 111 is rocked clockwise about pivot 52, and flange 113 in turn disengages lock lever 103 from pin 108, releasing lever 21 to the action of spring 33 to allow these parts to operate normally during the cycle. Upon release of lever 103, arm 96 swings clockwise under the tension of spring 98, and holds the lever elevated until link 75 is again moved forward during a blank cycle.

6. Rendering negative total lock ineffective

As before stated, it is sometimes desirable to perform bookkeeping operations wherein negative totals are automatically printed along with debit totals, and in such instances it is unnecessary to notify the operator of the presence of an overdraft in the totalizer. To permit this on machines provided with the above described negative total lock, the following construction is provided.

Arm 105 is guided for vertical movement in a slot in a bracket 115 secured to the machine frame. A shoulder 116 is provided on arm 105, and the lower end of the arm is formed with a finger piece 117. It is only necessary that the operator depress arm 105 against the tension of spring 104 and move the arm slightly to the rear, until shoulder 116 hooks under the right hand portion of bracket 115, as shown in Figure 8. The amount of movement required to move shoulder 116 under bracket 115 is sufficient to swing lock lever 100 upwardly to ineffective position. The parts are held in this position by spring 104 until arm 105 is manually released.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, a totalizer, a traveling paper carriage, cycle initiating means, means, controlled by the carriage, to operate the cycle initiating means, and means, controlled by the totalizer and operating during one cycle, to render the said means controlled by the carriage ineffective for initiating the succeeding cycle.

2. In a machine of the class described, a totalizer, a traveling paper carriage, cycle initiating means, means, controlled by the carriage, to operate the cycle initiating means, means to normally latch the said means controlled by the carriage in ineffective position during a portion of a machine cycle, and means controlled by the totalizer to hold said latching means in effective position.

3. In a machine of the class described, a totalizer, a traveling paper carriage, cycle initiating means, means, controlled by the carriage, to operate the cycle initiating means, means to normally latch the said means controlled by the carriage in ineffective position during a portion of a machine cycle, means controlled by the totalizer to hold said latching means in effective position, and a manually operated means for operating the cycle initiating means and for releasing the said holding means.

4. In a machine of the class described, a totalizer, a traveling paper carriage, cycle initiating means, means, controlled by the carriage, to operate the cycle initiating means, means to normally latch the said means controlled by the carriage in ineffective position during a portion of a machine cycle, means controlled by the totalizer to hold said latching means in effective position, and a manually adjustable means for latching the said holding means in ineffective position.

5. In a machine of the class described, a totalizer, means to initiate a machine cycle, a traveling carriage, means controlled by the carriage for operating the cycle initiating means, the second mentioned means including a spring actuated lever, a latch movable into and out of position to prevent movement of the lever, a normally ineffective member for holding said latch in effective position, and mechanism controlled by the totalizer and operable during a blank cycle for rendering the holding member effective.

6. In a machine of the class described, a totalizer, means to initiate a machine cycle, a traveling carriage, means controlled by the carriage for operating the cycle initiating means, the second mentioned means including a spring actuated lever, a latch movable into and out of position to prevent movement of the lever, a normally ineffective member for holding said latch in effective position, mechanism controlled by the totalizer and operable during a blank cycle for rendering the holding member effective, a motor bar for operating the cycle initiating means, and means under control of the motor bar for rendering the holding member ineffective.

WALTER A. ANDERSON.